Feb. 18, 1969 F. E. GERLITZ, JR., ET AL 3,427,878
PORTABLE LIQUID MEASUREMENT FLUME
Filed Jan. 18, 1968 Sheet 1 of 3

INVENTORS
Frank E. Gerlitz Jr.
Calvin E. Lewis
BY
ATTORNEYS

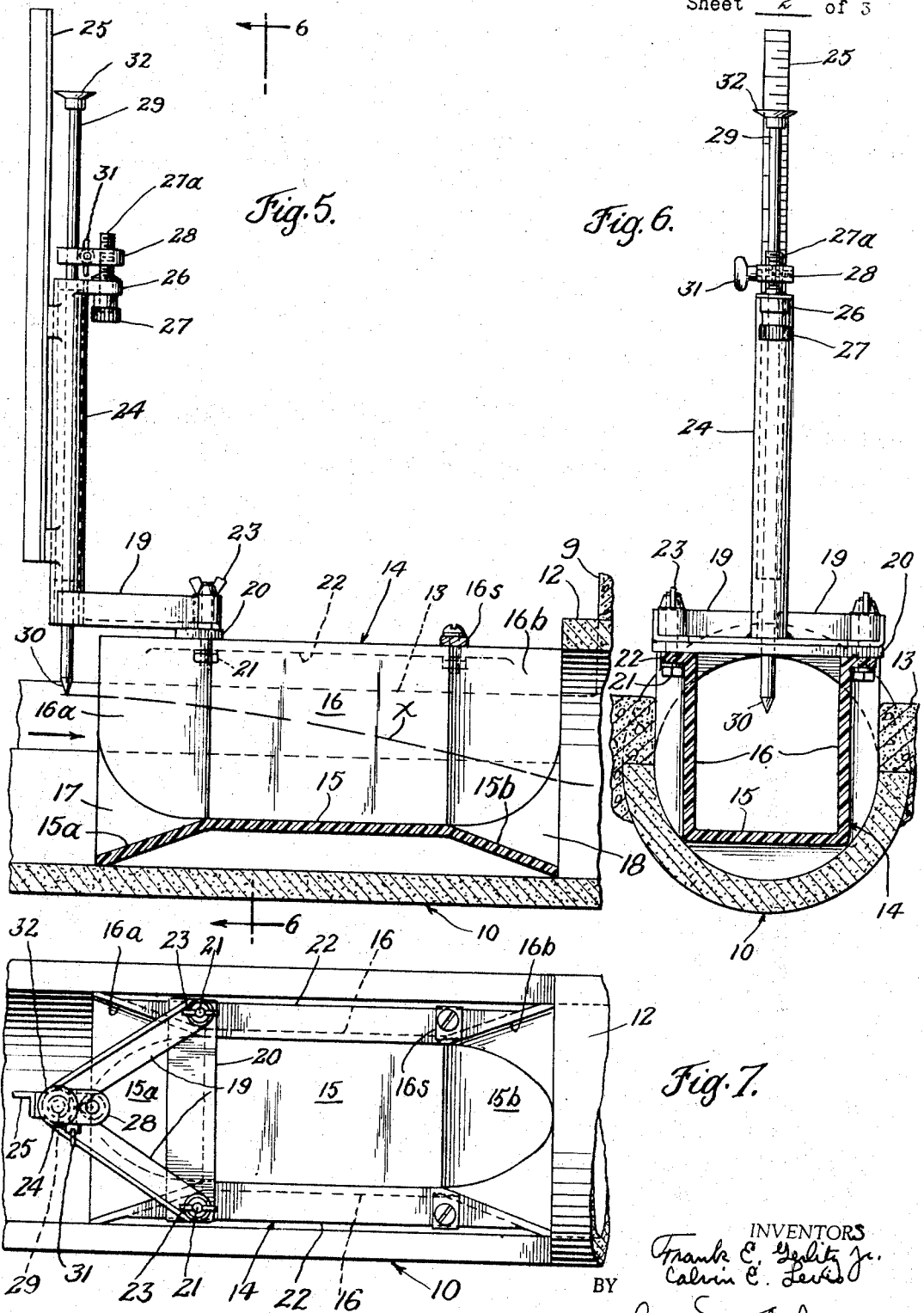

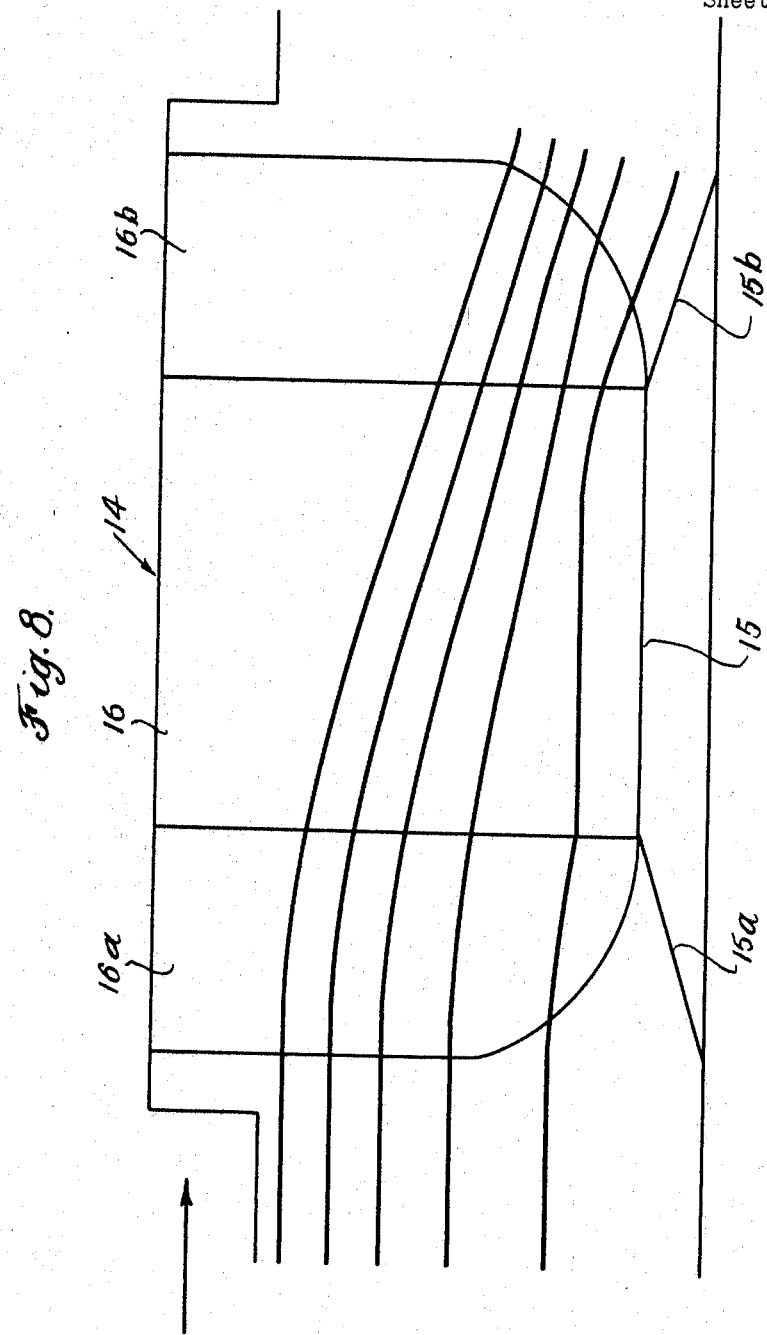

United States Patent Office 3,427,878
Patented Feb. 18, 1969

3,427,878
PORTABLE LIQUID MEASUREMENT FLUME
Frank E. Gerlitz, Jr., Lancaster, and Calvin E. Levis, Millersville, Pa., assignors to F. B. Leopold Company, Inc., Zelienople, Pa., a corporation of Delaware
Continuation-in-part of application Ser. No. 474,883, July 26, 1965. This application Jan. 18, 1968, Ser. No. 705,256
U.S. Cl. 73—215        2 Claims
Int. Cl. G01f 1/00

ABSTRACT OF THE DISCLOSURE

Liquid measuring equipment, particularly adapted for use in measuring liquid flow in an upwardly open conduit extended across the floor of a manhole, the mechanism comprising a flume having an external profile adapted to fit the inside contour of the bottom and sides of the upwardly open conduit, and measuring equipment adapted to be mounted on and transported with the flume.

---

The present application is a continuation-in-part of my application Ser. No. 474,883, filed July 26, 1965, now abandoned.

This invention relates to liquid flow measurement equipment and is particularly concerned with measurement equipment incorporating a venturi flume and adapted for use in the measurement of liquid flow, especially in circular conduits which are only partially filled with the liquid.

One of the principal objects of the invention is the provision of a measurement-type flume, preferably with a measurement indicating or gauging device mounted thereon, the entire assembly or equipment being arranged for convenient insertion into and withdrawal from an upwardly open flow channel, so that the assembly may readily be transported from place to place in order to measure liquid flow at different localities or in different flow channels.

Although not limited in its application, the device of the invention is especially suited to the measurement of sewage flow, for instance in the upwardly open sewage flow conduits commonly found in standard sewer manholes.

The invention is also concerned with the novel construction of the measurement flume itself and also of the gauging device or equipment adapted to be associated with the flume, the flume and gauging device being arranged to provide maximum convenience in insertion and removal of the entire assembly so as to take measurements alternatively in any of a multiplicity of sewer manholes.

The shaping of the various walls of the flume and also the construction of the gauging device are further adapted to provide for accurate and rapid measurement of fluid flow, notwithstanding the portability of the assembly.

How the foregoing and other objects and advantages are attained will appear more fully from the following description referring to the accompanying drawings illustrating preferred embodiments of the invention, and in which—

FIGURE 5 is a view similar to the right hand portion of FIGURE 3, and further illustrating the mounting of the flow gauging device which is preferably employed in combination with the portable flume;

FIGURE 6 is a view of the equipment shown in FIGURE 5 and taken on the line 6—6 of FIGURE 5;

FIGURE 7 is a plan view of the equipment shown in FIGURE 5; and

FIGURE 8 is a view illustrating the position of lines representing the surface of the liquid flowing through the flume with different flow quantities present.

Figure 1:
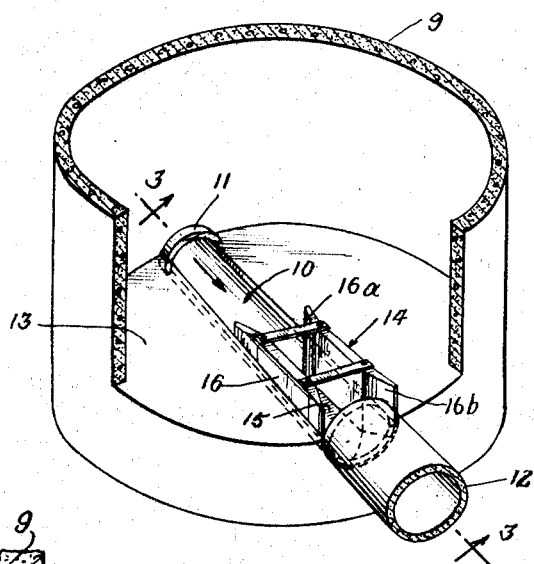
FIGURE 1 is a somewhat diagrammatic perspective view of a portion of a manhole, with the side wall cut out in order to illustrate the sewage flow channel therein and also showing the flume of the present invention inserted in the flow channel.
Figure 2:
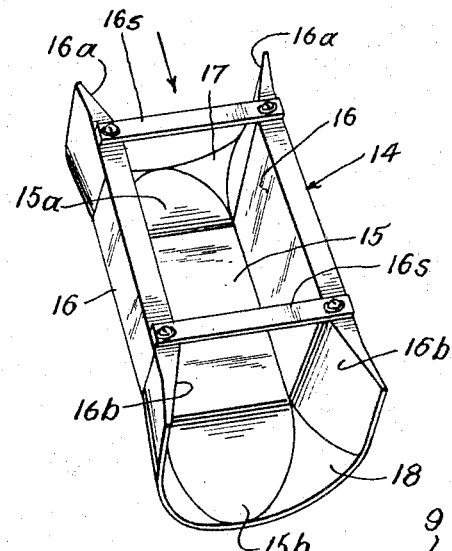
FIGURE 2 is a perspective view of the flume shown in FIGURE 1 but illustrating the flume on an enlarged scale.
Figure 3:
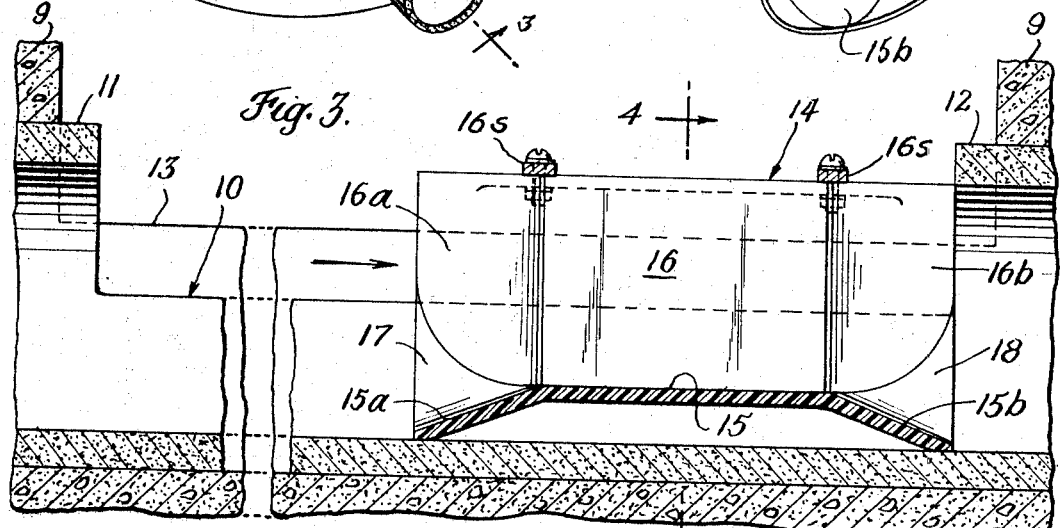
FIGURE 3 is a vertical sectional view taken generally as indicated by the section line 3—3 on FIGURE 1, but on an enlarged scale, and showing parts of the flow channel through the manhole and also illustrating the flume inserted therein.

In a typical or standard manhole such as illustrated in FIGURE 1, the side wall 9 of the manhole is ordinarily generally cylindrical and has an inside diameter approximating 4 feet. The flow channel for the sewage or other liquid is provided by a conduit 10 having inlet and outlet portions indicated respectively at 11 and 12, the portion of the conduit within the manhole 9 being cut away at the top down to a point approximately half way through the conduit as is shown in various of the figures. It will be understood that a conduit such as shown in FIGURE 1 may of course be made up of a number of sections or conduit pieces. The bottom of the manhole ordinarily comprises concrete or mortar such as indicated at 13, and this may desirably be built up slightly above the level of the middle of the conduit, so as to avoid overflow of the liquid into the bottom of the manhole.

The flume provided according to the present invention is generally indicated at 14 and includes a midsection made up of a bottom wall 15 and side walls 16—16, the bottom and side walls being flat and arranged at right angles to each other, so as to provide a flow channel of rectangular section. Toward the entrance or upstream end of the flume, the bottom wall is inclined as indicated at 15a and the side walls are also inclined as is indicated at 16a in order to provide a smooth transition and create a venturi effect. Similarly inclined bottom and side walls are provided at the downstream end of the flume as indicated at 15b and 16b. Both the upstream and the downstream edges of the bottom and side wall parts 15a and 16a and 15b and 16b are dimensioned to substantially engage the bottom and sides of the conduit 10 in order to prevent bypass of liquid beneath or at the side of the flume and thus ensure that all of the liquid flows through the flume. Curved segmental wall parts 17 and the upstream end and 18 at the downstream end interconnect the inclined surfaces 15a and 16a at the upstream end and the inclined surfaces 15b and 16b at the downstream end and provide for completion of the fit of the upstream and downstream edges of the flumes, within the semi-cylindrical or upwardly open channel provided in the manhole by the conduit 10 and the cutting away of the upper portion thereof.

The inclined wall surfaces at each end of the flume thus provide a profile at the upstream and downstream edges adapted to fit the inside wall of the upwardly open semi-cylindrical conduit. This arrangement not only provides against bypassing of liquid, as above noted, but also results in spacing of the flume walls from the conduit wall in the region intermediate the upstream and downstream edges, and this is desirable from the standpoint of accuracy of fit of the flume in the conduit, even in situations where irregularities or joints occur in the conduit at a position between the upstream and downstream edges of the flume.

Figure 4:
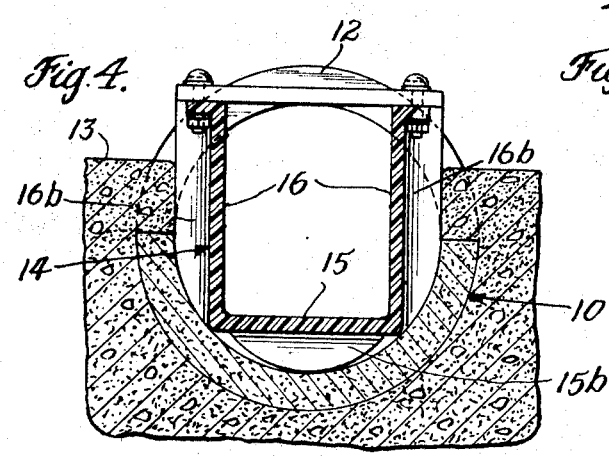
FIGURE 4 is a transverse sectional view of the sewer pipe associated with the manhole, having the upper portion cut away to provide the sewage flow channel, and having the flume of the present invention inserted therein, the view being taken as indicated by the section line 4—4 on FIGURE 3.

As seen in several of the figures, the bottom 13 of the manhole is desirably built up somewhat at the sides of the conduit 10, thereby deepening the flow channel provided and, as above noted, avoiding overflow of the liquid onto the floor of the manhole. Advantageously the side edge portions of the upstream and downstream ends of the flume are shaped to engage the adjoining edges of the floor (see particularly FIGURE 4), so that the flume, especially at the upstream end thereof will engage the sides of the flow channel up to the maximum height of the liquid when the flume is positioned in the conduit.

A flume such as described above, when positioned in a flow channel will cause the level of the liquid toward the entrance end to rise somewhat, and the extent of this increase in the level of the liquid will depend upon the amount of liquid flowing through the conduit. A typical set of water surface profiles for different quantities of flow is illustrated in FIGURE 8, plotted upon a diagrammatic representation of the flume.

It will be understood that the flume of the present invention will be differently dimensioned in order to cooperate with flow conduits of different sizes and further that the characteristics flow level curves, one family of which is illustrated in FIGURE 8, will be different for flumes of different sizes, the curves in FIGURE 8 being presented only as one illustrative example.

While the portable flume of the present invention may to handled as a unit separate from the measuring or gauging equipment itself, it is preferred that the gauging equipment be associated therewith, and this association is illustrated in FIGURES 5, 6 and 7. In one embodiment of the use of the equipment as shown in FIGURES 1 to 4, the flume may be placed in the flow channel and thereafter the gauging equipment may be mounted upon or connected to the flume. For this purpose tie straps 16a between the upper edges of the side walls of the flume, as shown at 16s may be provided for convenience in handling the flume. However, in the preferred embodiment, as is illustrated in FIGURES 5, 6 and 7, the gauging equipment is connected with or mounted upon the flume, and the entire assembly is handled as a unit in being moved from manhole to manhole for purposes of flow measurement. In this case one of the transverse tie straps 16s is removed and the gauging device mounted in place thereof.

Turning now to FIGURES 5, 6 and 7 it will be seen that the gauging equipment comprises a base of generally triangular shape when viewed in plan as in FIGURE 7, the base being made up of a pair of angle pieces 19 positioned at adjoining sides of a triangle, the two free ends of the angle pieces being interconnected by the bar 20. At the corners between the bar 20 and the pieces 19, apertures are provided to cooperate with bolts 21 which also extend upwardly through apertures in the flanges 22 provided along the upper edges of the flume. And the assembly is secured together by means of wing nuts 23, thereby mounting the gauging equipment in fixed position with relation to the flume. The arrangement of the flanges 22 to extend outwardly is of advantage in facilitating convenient access to the fastening bolts 21 and the wing nuts 23 in regions outside of the flume itself.

The base structure 19–20 supports a vertical tube 24 which in turn carries a scale 25, the scale 25 and tube 24 being fixed in relation to the base 19–20 and thus to the flume itself. At the upper end of the tube 24 an apertured lug 26 projects toward one side in order to support the rotative vernier adjustment screw 27 which is journalled in the aperture in the block 26, but which is not vertically movable therein. The upper end of the adjustment screw is threaded as indicated at 27a and is received in a threaded aperture in the lug member 28 which is slit toward its left hand end when viewed as in FIGURES 5 and 7 and recessed to receive the vertically movable rod 29 which extends through the tube 24 and which has a gauge point 30 at its lower end. A bolt with a wing nut 31 are associated with the slit part of the lug member 28 in order to frictionally tighten the lug member against the rod 29 and thus secure the rod in the lug member 28. At its upper end the rod 29 carries an indicator 32 projecting into proximity to the scale 25 so that the vertical position of the rod 29 may readily be read upon the scale 25.

In use, assuming a flow level such as represented by the line $x$ in FIGURE 5, which corresponds to one of the lines shown in FIGURE 8, the lower gauge point 30 of the rod 29 is adjusted until it just touches the liquid and a reading is then taken on the scale 25. With a flume constructed in the manner herein described and illustrated, the reading of a liquid level as depicted in FIGURE 5 will give a scale reading which may readily be converted to rate of flow, provided the equipment is used in association with typical conduits in which the grade is not in excess of about 2%. Since most such sewer lines have grades not in excess of about 2%, the instrument is capable of accurate measurement in most sewer lines and may readily be transported from one manhole to another to secure desired readings.

With regard to the adjustment of the rod 29, it may be noted that in a typical operation the wing nut 31 is initially loosened and the rod 29 set to the approximate gauging position with reference to the liquid level. Thereafter the wing nut 31 may be tightened and the vernier screw 27 adjusted until the lug member 28 and with it the rod 29 is brought accurately to the position in which the gauging point 30 just contacts the surface of the liquid.

In the preferred practice of the invention, the flume itself is desirably made of glass fiber reinforced resin, being molded in various sizes conforming with standard sewer conduit sizes. When made of such material, the flume is relatively light and yet very strong and also highly resistant to corrosive influences.

Figure 4A:
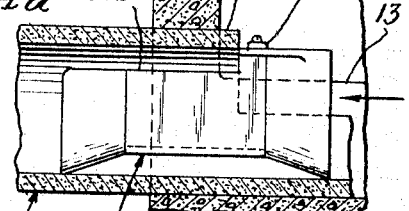
FIGURE 4a is a fragmentary view taken similarly to FIGURE 3 but on a reduced scale and illustrating a somewhat modified arrangement and use of the flume of the invention.

In the embodiment shown in FIGURE 4a the flume construction 14a generally similar to that described above is employed, but here the upper portions of the walls of the flume toward the discharge end (here shown toward the left of the figure) are cut away as indicated at 14b in order to permit insertion of the discharge end into the outlet portion 12 of the sewer line running through the manhole. As before, it is contemplated that the gauge device fully shown in and described with reference to FIGURES 5, 6 and 7 is preferably applied to and handled unitarily with the flume, and with the gauge rod 29 positioned with its gauging point 30 upstream of the flume, i.e., toward the right as viewed in FIGURE 4a. For this purpose the tie strap 16s will again be removed and replaced by the base structure of the gauging device.

The arrangement of FIGURE 4a also provides for ready removability and portability of the flume and the gauging device mounted thereon, but the embodiment of FIGURE 4a may be employed in certain situations where the length of shape of the open flow channel is not adequate to accommodate the flume but in which the outlet end portion of the sewer line will accommodate or receive a portion of the flume itself.

As above indicated, the invention contemplates in its preferred embodiment the mounting of the measurement device on the flume so that the measurement device and the flume may be unitarily handled. In accordance with typical preferred practice, the flume, with the measurement device mounted thereon, is inserted in an upwardly open conduit for the purpose of effecting measurement of flow in the conduit. While it is contemplated that the assembly of the flume and the measurement device be capable of being moved or transported from one location to another for the purpose of flow measurement, the equipment of the present invention may also be used in other ways to advantage. Thus, a flume according to the invention having a measurement device mounted thereon may be positioned in a given manhole, to remain there permanently, for instance for the purpose of making periodic measurements, and in this case, if desired, any suitable means may be provided for fastening the flume in place.

Still further, the flume itself having the rectangular measurement channel formed therein, but without having a measurement device permanently mounted on the flume, may be placed within an upwardly open semi-cylindrical conduit in a manhole and such flume may remain in that manhole. Similar flumes may be inserted in the conduits in other manholes and if desired a measurement device may be taken from flume to flume and temporarily mounted upon a plurality of the flumes in succession, for the purpose of making flow measurements at different points. When used in this way the flume may also if desired be fastened in place, but in some situations that is not even needed.

Also, a flume having the rectangular flow channel therein and constructed according to the present invention, may be inserted in an upwardly open semi-cylindrical conduit in a manhole or at some other location, and any of a variety of other forms of measurement devices may be employed with such a flume.

In all types of usage of the flume according to the present invention, the arrangement has a number of advantages in common, including the fact that the shape of the various walls of the flume, providing the upstream and downstream edge profiles fitting the inside surface of the upwardly open semi-cylindrical conduit, ensures accuracy of fit and minimization of fluid bypass around the flume. The accuracy of fit is also enhanced by virtue of the inclined wall portions at the ends of the flume which provide for spacing between the flume and the conduit between the upstream and downstream edges thereof and thus accommodate irregularities or joints in the conduit.

Moreover, in all types of usage of the flume of the present invention, employment of a separate and preformed flume adapted to be inserted into an upwardly open conduit makes possible accuracy of shaping of the rectangular flow measurement of the channel which is difficult to accomplish if such measurement channels are molded or otherwise formed in situ.

We claim:

1. Equipment for measurement of liquid flow in an upwardly open semi-cylindrical conduit only partially filled with the liquid, comprising a flume insertable through the open upper part of the conduit while liquid is flowing in the conduit, the flume having bottom and side edge portions at its upstream and downstream ends having an external semi-cylindrical profile and dimensioned substantially to fit the inside contour of the bottom and sides of the conduit up to the maximum height of the liquid when the flume is positioned in the conduit, and the flume having a substantially rectangular internal flow channel for flow measurement with a bottom wall portion inclined upwardly from the upstream bottom edge in spaced relation to the bottom of the conduit and inclined downwardly to the downstream bottom edge and having side wall portions inclined inwardly from the upstream side edges thereof in spaced relation to the side walls of the conduit and inclined outwardly to the downstream side edges, to provide for seating of the flume in the conduit at the upstream and downstream edges thereof with clearance between the flume and the conduit in the region between the upstream and downstream edges.

2. Equipment according to claim 1 and further including a flow measurement device mounted on the flume, the flume, together with the flow measurement device, being unitarily insertable and removable through the open upper part of a conduit while liquid is flowing in the conduit.

References Cited

UNITED STATES PATENTS

| | | | |
|---|---|---|---|
| 2,028,273 | 1/1936 | Clausen | 1—22 X |
| 2,928,251 | 3/1960 | Waring | 61—22 X |
| 3,124,000 | 3/1964 | Melas | 73—215 |
| 3,301,050 | 1/1967 | McNulty | 73—215 |

RICHARD C. QUEISSER, *Primary Examiner.*

E. D. GILHOOLY, *Assistant Examiner.*